United States Patent [19]

Walsh

[11] 4,371,311
[45] Feb. 1, 1983

[54] COMPRESSION SECTION FOR AN AXIAL FLOW ROTARY MACHINE

[75] Inventor: Thomas C. Walsh, New Britain, Conn.

[73] Assignee: United Technologies Corporation, Hartford, Conn.

[21] Appl. No.: 144,714

[22] Filed: Apr. 28, 1980

[51] Int. Cl.³ .............................................. F01D 9/00
[52] U.S. Cl. ................................. 415/182; 415/199.5; 415/213 C
[58] Field of Search ............. 415/213 C, 199.5, 199.4, 415/198.1, 182, 181

[56] References Cited

U.S. PATENT DOCUMENTS

| | | | |
|---|---|---|---|
| 2,435,236 | 2/1948 | Redding | 415/181 |
| 2,672,279 | 3/1954 | Willgoos . | |
| 2,801,071 | 7/1957 | Thorp . | |
| 2,869,820 | 1/1959 | Marchant et al. . | |
| 2,955,747 | 10/1960 | Schwaar | 415/181 |
| 2,974,858 | 3/1961 | Koffel et al. | 415/181 |
| 2,991,929 | 7/1961 | Stalker | 415/181 |
| 4,011,028 | 10/1975 | Borsuk | 415/199.5 |

FOREIGN PATENT DOCUMENTS

| | | | |
|---|---|---|---|
| 338916 | 9/1917 | Fed. Rep. of Germany ... | 415/199.5 |
| 753561 | 7/1956 | United Kingdom | 415/181 |

Primary Examiner—Louis J. Casaregola
Assistant Examiner—Jeffrey A. Simenauer
Attorney, Agent, or Firm—Gene D. Fleischhauer

[57] ABSTRACT

A compression section of a gas turbine engine having an annular flow path is disclosed. Various construction details which increase the efficiency of an array of rotor blades in the compression section are developed. The annular flow path is contoured to cause the streamlines of the flow path to follow a pattern of varying radial curvature. In one embodiment, a conical surface extending between the base of each airfoil on the inner wall causes a flow path contraction and a cylindrical surface on the outer wall facing the tip of each airfoil enables close clearances.

7 Claims, 4 Drawing Figures

COMPRESSION SECTION FOR AN AXIAL FLOW ROTARY MACHINE

BACKGROUND OF THE INVENTION

This invention relates to gas turbine engines, and more particularly to an annular flow path in the compression section of such an engine.

A gas turbine engine has a compression section, a combustion section and a turbine section. An annular flow path for working medium gases extends through the engine. An inner wall and an outer wall bound the annular flow path. In typical prior art constructions, arrays of stator vanes extend radially inwardly from the outer wall and rows of rotor blades extend radially outwardly from the inner wall. The arrays of stator vanes and the arrays of rotor blades are interdigitated. In the compression section, the walls of the flow path gradually converge with respect to each other. One such construction having a flow path converging at both the outer wall and the inner wall is illustrated in U.S. Pat. No. 2,869,820 to Marchant et al. entitled "Rotors For Axial Flow Compressors Or Turbines." Another construction having a converging outer wall, conical in shape, and a cylindrical inner wall is shown in U.S. Pat. No. 2,672,279 to Willgoos, entitled "End Bell Construction." U.S. Pat. No. 2,801,071 to Thorpe, entitled "Bladed Rotor Construction" is a construction having a conical inner wall and a cylindrical outer wall.

In each of these constructions the rotor assembly and stator assembly cooperate to compress the working medium gases. As the gases are compressed the temperature and the total pressure of the gas rises. Across each array of rotor blades the increase in total pressure is accompanied by an increase in static pressure.

It is common practice to express static pressure distribution on an airfoil and across the airfoil in terms of a pressure coefficient P. The pressure coefficient P is defined as the dimensionless ratio of the static pressure rise between an upstream point and a point on the airfoil to the dynamic or velocity pressure at the upstream point. This may be represented by the formula $$P = \frac{p - p_o}{\frac{\pi V^2}{2}}$$

where
p represents the pressure at any point on the airfoil,
$P_o$ represents the pressure at a distance upstream from the airfoil, and
$\frac{1}{2}\rho V^2$ is the upstream velocity or dynamic pressure.

The aerodynamic loading across an airfoil is defined as the static pressure rise across the entire airfoil divided by the inlet dynamic pressure or velocity pressure. During operation, high aerodynamic loadings on airfoils are often accompanied by separating flow. Because the airflow is in the direction of increasing static pressure in a compressor, there is a tendency of the flow to "separate" from the blade and wall surfaces.

Separation decreases the efficiency of the array of rotor blades and in extreme cases can result in a phenomenon known as surge. Compressor surge is generally characterized by a complete stoppage of flow, or a flow reversal, through the compressor system, or by a sharp reduction of the airflow handling ability of the engine for particular operating rotational speed. The latter is called a "hung surge." The engine will generally not respond to throttle increases properly when such a condition exists.

Accordingly, scientists and engineers are seeking to improve the surge margin and efficiency of an array of rotor blades by affecting the distribution of aerodynamic loading across the airfoils.

SUMMARY OF THE INVENTION

A primary object of the present invention is to increase the efficiency of an array of rotor blades in a compression section of a gas turbine engine. An increase in the surge margin of the compression section is sought. A specific goal is to shift the distribution of loading across the airfoils of the rotating blades in the spanwise direction.

According to the present invention, the distribution of aerodynamic loading on a rotating airfoil in an axial flow rotary machine is shifted spanwisely by causing the streamlines of the flow path in the edge regions adjacent the inner and outer walls to follow a curvature in the same radial direction with respect to the engine axis.

A primary feature of the present invention is the annular flow path of a compression section. The flow path has an inner wall and an outer wall. A rotating airfoil has an edge region extending between the walls. Another feature is the wall regions where the slopes of the inner and outer walls change with respect to the engine axis. In one embodiment, these wall regions are disposed between the arrays of rotating airfoils and the arrays of non-rotating airfoils and are connected by frusto-conical wall surfaces at the roots of airfoils and cylindrical wall surfaces spaced radially by a clearance from the tips of airfoils.

A principal advantage of the present invention is the increase in efficiency of an array of rotor blades which results from shifting the distribution of loading in the spanwise direction. An increase in the surge margin of the compression section results from the spanwise redistribution of localized loadings. In one embodiment, a further increase in the efficiency of a stage results from the closer clearance between rotating and non-rotating parts enabled by the cylindrical surfaces which face the tips of rotating and non-rotating airfoils as compared with airfoils having tips spaced radially by a clearance from a frusto-conical surface.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
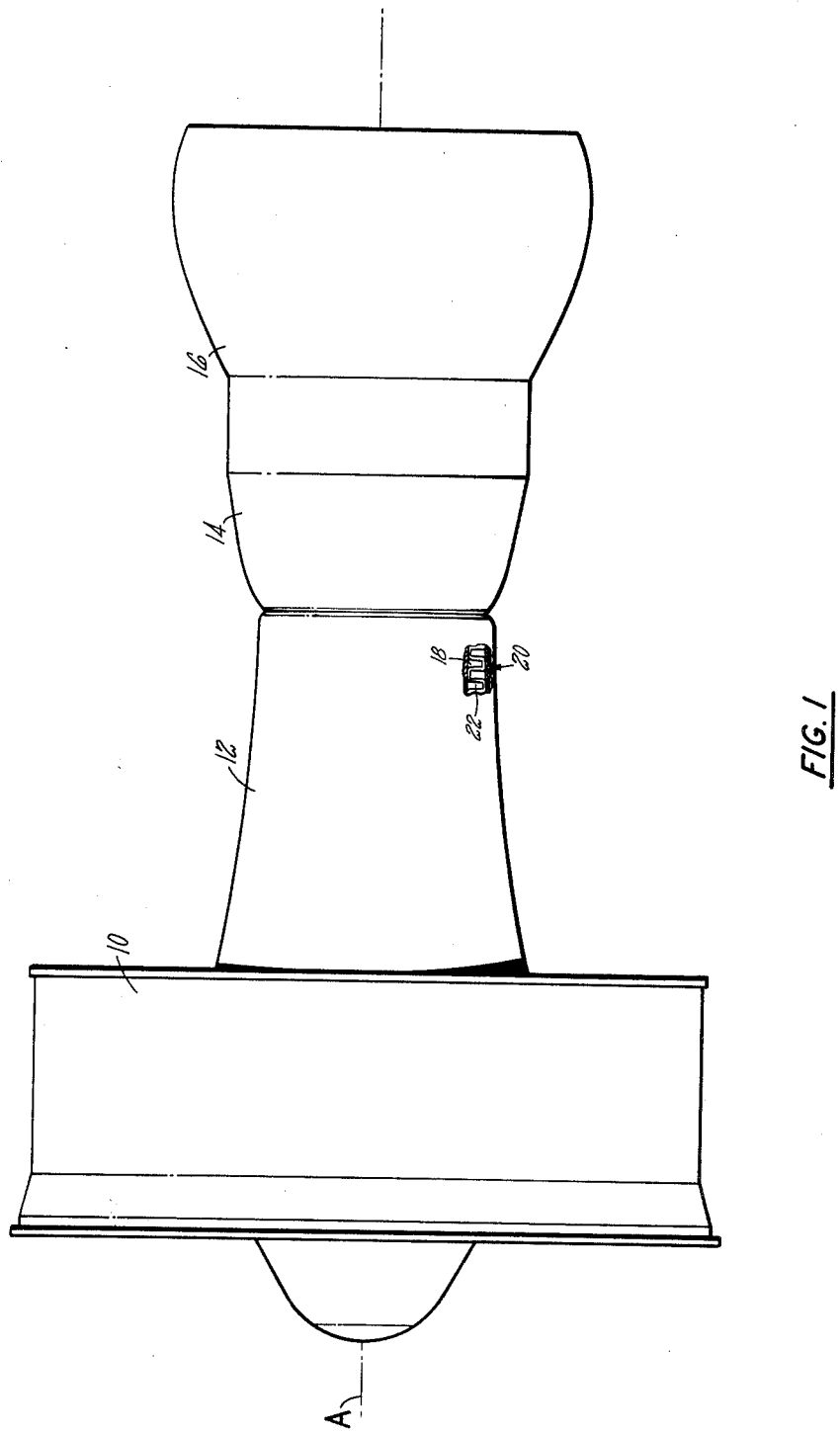
FIG. 1 is a simplified, side elevation view of the turbofan engine with the outer case broken away to reveal a portion of the rotor and stator assemblies in the compressor section.

A turbofan gas turbine engine embodiment of the invention is illustrated in FIG. 1. Principal sections of the engine include a fan compression section 10, a core compressor section 12, a combustion section 14 and a turbine section 16. The engine has an axis A. A rotor assembly 18 extends axially through the compressor section and the turbine section. A stator assembly 20 circumscribes the rotor assembly. An annular flow path 22 for working medium gases extends through the compressor section and is bounded by portions of the stator assembly and the rotor assembly.

Figure 2:
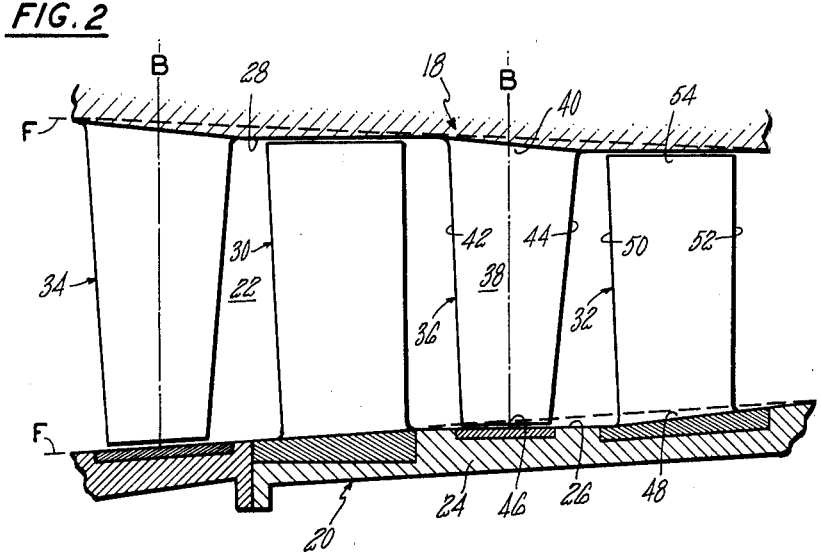
FIG. 2 is an enlarged view of a portion of the rotor and stator assemblies shown in FIG. 1.

As shown in FIG. 2, the stator assembly 20 includes an outer case 24. The outer case has an outer wall 26 circumscribing the annular flow path. The rotor assembly 18 has an inner wall 28 spaced inwardly from the outer wall. The inner wall bounds the annular flow path 22. Walls of constant slope bounding the annular flow path are shown by the broken line F. Arrays of stator vanes, as represented by the single stator vane 30 and the single stator vane 32, are attached to the outer wall. The vanes extend inwardly into proximity with the inner wall. The arrays of stator vanes and arrays of rotor blades, as represented by the single rotor blade 34 and the single rotor blade 36, are interdigitated. The arrays of rotor blades extend outwardly into proximity with the outer wall.

Each rotor blade 36 has an airfoil 38. The airfoil has a base 40, a leading edge 42, a trailing edge 44 and a tip 46. Each airfoil has a spanwise axis B extending outwardly in a substantially radial direction. Each stator vane 32 has a base 48, a leading edge 50, a trailing edge 52 and a tip 54.

Figure 3:
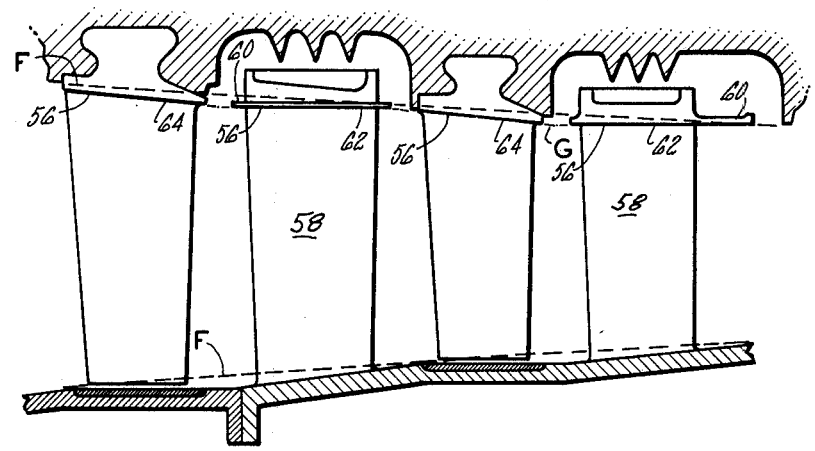
FIG. 3 is a sectional view corresponding to a portion of the FIG. 2 view and shows an alternate embodiment.

FIG. 3 is an alternate embodiment of FIG. 2 having an inner wall 56 formed by elements of the rotor assembly and the stator assembly. Each stator vane 58 has a shroud 60. The shroud extends axially into proximity with the rotor assembly and has an outwardly facing surface 62. The rotor assembly has an outwardly facing surface 64. These outwardly facing surfaces on the rotor assembly and on the stator assembly together define the inner wall 56 as shown by the dotted line G. The broken line F illustrated walls of constant slope bounding the annular flow path.

Figure 4:
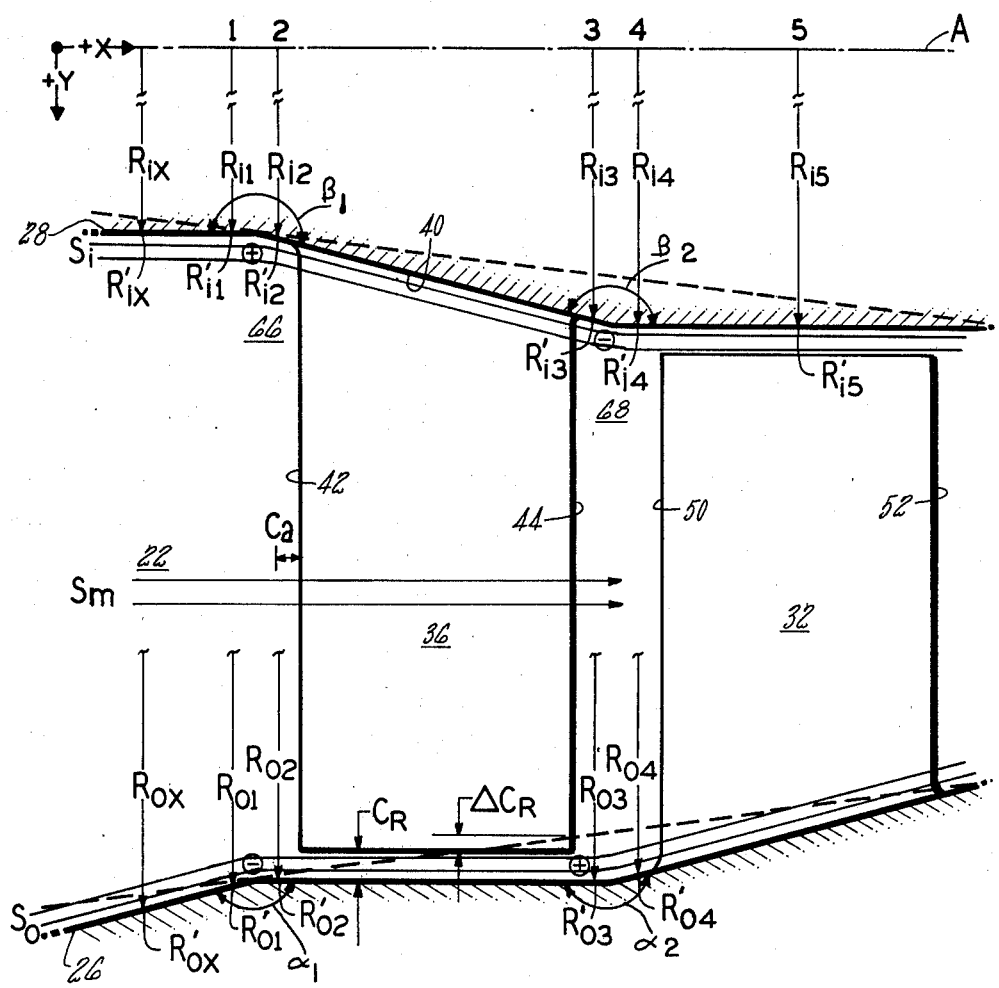
FIG. 4 is a diagrammatic illustration of the rotor and stator assemblies shown in FIG. 2.

FIG. 4 is a diagrammatic illustration of a portion of the compressor section 12 showing the paths of particles of working medium gases which flow through the compressor section near the outer wall 26, the inner wall 28 and the middle of the annular flow path 22. These paths are commonly known as streamlines. The streamlines $S_o$ are adjacent the outer wall, the streamlines $S_m$ are approximately in the middle of the flow path and the streamlines $S_i$ are adjacent the inner wall. Associated with the leading edge 42 of each airfoil is a leading edge region 66. Associated with the trailing edge 44 is a trailing edge region 68. In the edge region at the outer wall, each streamline $S_o$ has a first curvature providing a transition between the path of the particles upstream of the leading edge and downstream of the leading edge and a second curvature providing a transition between the path of the particles upstream of the trailing edge and downstream of the trailing edge. In the edge region at the inner wall, each streamline $S_i$ has a first curvature providing a transition between the path of the particles upstream of the leading edge and downstream of the leading edge and a second curvature providing a transition between the path of the particles upstream of the trailing edge and downstream of the trailing edge. The paths $S_i$ and $S_o$ are functions of x as measured in a plane containing the axis A of the engine (x axis) and intersecting a point on the streamline. Such a plane is a radial plane. The y axis, perpendicular to the x axis, extends in the spanwise direction and lies in the radial plane. Any streamline is described by an equation of the form $y = f(x)$. The curvature at the point on the streamline is given in rectangular coordinates by the formula $$\text{Curvature} = \frac{\frac{d^2y}{dx^2}}{\left[1 + \left(\frac{dy}{dx}\right)^2\right]^{3/2}}$$

where $dy/dx$ and $d^2x/dx^2$ are, respectively, the first and second derivates of y with respect to x.

The inner wall 28 is spaced a distance $R_{ix}$ from the axis of the engine at any axial location x. At the location x, the inner wall has a slope $R'_{ix}$ with respect to the axis of the engine as measured in a plane intersecting the outer wall and containing the axis of the engine. The outer wall 26 circumscribing and bounding the flow path is spaced a distance $R_{ox}$ from the axis of the engine at the axial location x and has a slope $R'_{ox}$ with respect to the axis of the engine as measured in the plane intersecting the outer wall and containing the axis of the engine.

In the leading edge region 66 at the outer wall 26, the outer wall has a surface having an interior angle $\alpha_1$, which is less than one hundred and eighty degrees (180°). $R_{ox}$ and $R'_{ox}$ have a magnitude $R_{o1}$ and $R'_{o1}$ at a first location and a magnitude $R_{o2}$ and $R'_{o2}$ at a second location. The second location is downstream of the first location such that the outer wall is further away from the axis of the engine at the first location than is the outer wall at the second location and the slope at the first location is not equal to the slope at the second location. As a consequence, the ratio of $R_{o1}$ to $R_{o2}$ is greater than one ($R_{o1}/R_{o2} > 1.0$), and $R'_{o1}$ is not equal to $R'_{o2}$ ($R'_{o1} \neq R'_{o2}$). The absolute value of $R'_{o1}$ is greater than the absolute value of $R'_{o2}$ ($|R'_{o1}| > |R'_{o2}|$). As shown, the slope of $R'_{o2}$ is equal to zero.

In the leading edge region 66 at the inner wall 28, the inner wall has a surface having an interior angle $\beta_1$, which is greater than one hundred and eighty degrees (180°). $R_{ix}$ and $R'_{ix}$ have a magnitude $R_{i1}$ and $R'_{i1}$ at a first location and a magnitude $R_{i2}$ and $R'_{i2}$ at a second location. The second location is downstream of the first location such that the inner wall is closer to the axis of the engine at the first location than is the inner wall at the second location and the slope at the first location is not equal to the slope at the second location. As a consequence, the ratio $R_{i1}$ to $R_{i2}$ is less than one ($R_{i1}/R_{i2} < 1.0$) and $R'_{i1}$ is not equal to $R'_{i2}$ ($R'_{i1} \neq R'_{i2}$). The absolute value of $R'_{i1}$ is less than the absolute value of $R'_{i2}$ ($|R'_{i1}| < |R'_{i2}|$). As shown, the slope of $R'_{i1}$ is equal to zero ($R'_{i1} = 0$).

In the trailing edge region 68 at the outer wall 26, the surface of the outer wall has an interior angle $\alpha_2$, which is greater than one hundred and eighty degrees (180°). $R_{ox}$ and $R'_{ox}$ have a magnitude $R_{o3}$ and $R'_{o3}$ at a first location and a magnitude $R_{o4}$ and $R'_{o4}$ at a second location. The second location is downstream of the first location such that the outer wall is further away from the axis of the engine at the first location than is the outer wall at the second location and the slope at the first location is not equal to the slope at the second location. As a consequence, the ratio of $R_{o3}$ to $R_{o4}$ is greater than one ($R_{o3}/R_{o4} > 1.0$) and $R'_{o3}$ is not equal to $R'_{o4}$ ($R'_{o3} \neq R'_{o4}$). The absolute value of $R'_{o3}$ is less than the absolute value of $R'_{o4}$ ($|R'_{o3}| < |R'_{o4}|$). As shown, the slope of $R'_{o3}$ is equal to zero.

In the trailing edge region 68 at the inner wall 28, the surface of the inner wall has an interior angle $\beta_2$, which is less than one hundred and eighty degrees (180°). $R_{ix}$ and $R'_{ix}$ have a magnitude $R_{i3}$ and $R'_{i3}$ at a first location and a magnitude $R_{i4}$ and $R'_{i4}$ at a second location. The second location is downstream of the first location such that the inner wall is closer to the axis of the engine at the first location than is the inner wall at the second location and the slope at the first location is not equal to the slope at the second location. As a consequence, the ratio $R_{i3}$ and $R_{i4}$ is less than one, that is ($R_{i3}/R_{i4} < 1.0$) and $R'_{i3}$ is not equal to $R'_{i4}$ ($R'_{i3} \neq R'_{i4}$). The absolute value of $R'_{i3}$ is greater than the absolute value of $R'_{i4}$ ($|R'_{i3}| > |R'_{i4}|$). As shown the slope of $R'_{i4}$ is equal to zero.

Downstream of the rotor blade 36, the inner wall 28 adjacent the vane 32 has a cylindrical surface facing outwardly. The surface extends axially beyond the leading edge 50 and trailing edge 52 of the vane. $R_{ix}$ and $R'_{ix}$ at any location facing the stator vane have a constant value $R_{i5}$ and $R'_{i5}$. In the embodiment shown, $R'_{i5}$ is equal to zero. The inner wall upstream of the vane and adjacent the rotor blade has a frusto-conical surface extending between the second location in the leading edge region (i2) and the first location in the trailing edge region (i3). The ratio of $R_{i2}$ to $R_{i3}$ is greater than one ($R_{i2}/R_{i3} < 1.0$) such that a flow path contraction on the inner wall occurs along the frusto-conical surface at the base 40 of the rotor blade. The outer wall upstream of the vane and adjacent the blade has a cylindrical surface extending between the second location in the leading edge region (o2) and the first location in the trailing edge region (o3). The ratio of $R_{o2}$ to $R_{o3}$ is equal to one ($R_{o2}/R_{o3} = 1.0$). A cylindrical surface faces the tips of the array of rotor blades and extends beyond the leading edge 42 at the trailing edge 44.

During operation of a gas turbine engine, working medium gases are flowed through the engine. The gases follow the annular flow path 22. In the compressor section 12, the rotor assembly 18 and the stator assembly 20 cooperate to compress the working medium gases causing the temperature and the total pressure of the gases to rise. Across the array of rotor blades 36 the increase in total pressure is accompanied by an increase in static pressure. The increase in static pressure causes an aerodynamic loading across each airfoil.

The contour of the outer wall 26 and the contour of the inner wall 28 influences this aerodynamic loading. As shown in FIG. 4, the streamlines $S_i$ follow the inner wall. The streamlines $S_o$ follow the outer wall. In the leading edge region, the curvature of the streamlines near the outer wall and the inner wall is positive, that is away from the axis of the engine. The curvature has a convex shape with respect to the axis of the engine. A static pressure gradient in the spanwise or radial direction must exist to enable this curvature of the streamlines. The local static pressure for the convex streamlines is higher at the inner wall and lower at the outer wall as compared with the average static pressure in the entire edge region. Moreover, the same local effect is seen when the pressure gradient for the contoured flow path is compared with the pressure gradient at the inner wall and the outer wall of a flow path following streamlines along walls shown by the dotted lines F. This effect on localized pressure is indicated in the leading edge region by a plus (+) sign at the inner wall and a minus (−) sign at the outer wall.

The loading across the airfoil, $$\frac{p - p_o}{\frac{pV^2}{2}},$$

is directly proportional to and most strongly a function of static pressure rise across the airfoil. Because the static pressure rise is the difference between the static pressure at a point upstream of the leading edge and at a point downstream of the trailing edge, the loading is decreased at the root of the airfoil and increased at the tip of the airfoil. The loading has shifted spanwisely as a result of the contours of the flow path.

The shift in spanwise loading is reinforced by the curvature of the outer wall and the inner wall in the trailing edge region. The streamlines $S_i$ follow the inner wall. The streamlines $S_o$ follow the outer wall. In the trailing edge region, the curvature of the streamlines near the outer wall and the inner wall is negative, that is toward the axis of the engine. The curvature has a concave shape with respect to the axis of the engine. Enabling this curvature is a static pressure gradient in the spanwise or radial direction. The local static pressure gradient for the concave streamlines is lower at the inner wall and higher at the outer wall, as compared with the average static pressure gradient in the entire leading edge region or with the local static pressure gradient at the inner wall and the outer wall of a flow path following streamlines along walls shown by the dotted lines F. This effect on localized pressure is noted in the trailing edge region by a minus (−) sign at the inner wall and a plus (+) sign at the outer wall. Because the static pressure rise is the difference between the static pressure at a point upstream of the leading edge and a point downstream of the trailing edge, the loading is further decreased at the root of the airfoil and further increased at the tip of the airfoil. This has strengthened the shift of the loading in the spanwise direction.

As will be appreciated, contouring the inner and outer walls in the leading edge region or contouring the inner and outer walls in the trailing edge region in this manner will cause a spanwise shifting of the loading distribution. Moreover, reversing the curvature of the streamlines from convex to concave in the leading edge or from concave to convex in the trailing edge region will cause a spanwise shift in the loading distribution in a direction opposite to the spanwise shift discussed above.

The application of the contours shown in FIG. 4 to the walls of a flow path at an array of rotating airfoils is helpful, for example, where the flowing working medium gases tend to first separate at the base of the airfoil. Such a separation is often found in the downstream stages of the compressor because the aerodynamic loading at the base of each airfoil is higher than the average aerodynamic loading across the airfoil or the aerodynamic loading across the tip of the airfoil. Decreasing the aerodynamic loading at the base of such an airfoil causes separation to occur further downstream along the airfoil and, once separation occurs, decreases the amount of separation at any point along the airfoil. Decreasing the amount of separation decreases the harmful effect separation has on efficiency. An increase in efficiency results for the rotor stage as compared with those designs where separation is untreated. Moreover, decreasing the loading at such a critical location enables the rotor stage to tolerate more of an increase in back pressure before the airfoil stalls. An increase in the surge margin of the compression section occurs.

In the particular configuration shown, an additional benefit is realized by having cylindrical surfaces facing the tips of the airfoil in a rotor-stator stage and by taking flow path contractions at the base of the airfoils. This construction enables a close clearance both between the tips of the rotor airfoils and the facing cylindrical outer wall and between the tips of the stator airfoils and the facing cylindrical inner wall.

As shown in FIG. 4, Cr is the radical clearance at assembly between the rotor tip and the stator wall and between the stator tip and the rotor wall. During operation, the radial clearance Cr enables the rotor-stator stage to accommodate differences in radial growth between the rotor assembly and the stator assembly. Because cylindrical surfaces face the airfoil tips, the differences in axial thermal growth, Ca, between the rotor assembly and the stator assembly do not affect the amount of radial clearance Cr. For an equivalent annular flow path having conical walls as shown by the dotted line F, the differences in axial thermal growth Ca does affect the amount of radial clearance Cr. The radial clearance Cr between the rotor tip and the stator wall is increased by an additional radial clearance ΔCr to enable the rotor tip to radially clear the stator wall as the rotor tip moves closer to the stator wall because of variations in axial growth. Accordingly the radial clearance between the rotor tip and the facing wall is smaller for the FIG. 4 construction as compared with a conical flow path and a concomitant increase in efficiency results.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A compression section of an axial flow rotary machine of the type having an annular flow path for working medium gases disposed about an engine axis, the working medium gases having streamlines which have in the radial direction a first curvature having a positive mathematical sign with respect to the axis of the engine and a second curvature having a negative mathematical sign with respect to the axis of the engine which comprises:

an outer wall circumscribing the annular flow path, the outer wall having a first geometric contour for causing the streamlines of the flow path adjacent the outer wall to have a curvature in the radial direction having a first mathematical sign with respect to the axis of the engine and having a second geometric contour axially spaced from the first contour of the outer wall for causing the streamlines of the flow path adjacent the outer wall to have a curvature in the radial direction having a second mathematical sign with respect to the axis of the engine;

an inner wall spaced inwardly from the outer wall and bounding the flow path, the inner wall having a first geometric contour for causing the streamlines of the flow path adjacent the inner wall to have a curvature in the radial direction having said first mathematical sign with respect to the axis of the engine and having a second geometric contour axially spaced from the first contour of the inner wall for causing the streamlines of the flow path adjacent the inner wall to have a curvature in the radial direction having said second mathematical sign with respect to the axis of the engine;

at least one array of rotor blades extending outwardly from the inner wall into proximity with the outer wall and including a plurality of airfoils, each airfoil having a spanwise axis, a first edge region extending spanwisely and a second edge region extending spanwisely;

wherein the first geometric contour of the outer wall and the first geometric contour of the inner wall are in the first edge region of each airfoil and wherein the second geometric contour of the inner wall and the second geometric contour of the outer wall are in the second edge region of the airfoil.

2. A compression section of an axial flow rotary machine of the type having an annular flow path for working medium gases disposed about an engine axis which comprises:

an outer wall circumscribing the annular flow path having a first wall surface at the intersection of the outer wall and a plane extending radially outwardly from the axis of the engine and containing the axis of the engine;

an inner wall spaced inwardly from the outer wall and bounding a flow path having a second wall surface at the intersection of the inner wall and a plane extending radially outwardly from the axis of the engine and containing the axis of the engine;

at least one array of rotor blades extending outwardly from the inner wall into proximity with the outer wall and including a plurality of airfoils, each airfoil having a spanwise axis and a first edge region extending spanwisely and a second edge region extending spanwisely, wherein the first wall surface has an interior angle which is less than one hundred and eighty degrees (180°) in the first edge region and an interior angle which is greater than one hundred and eighty degrees (180°) in the second edge region, and the second wall surface has an interior angle which is greater than one hundred and eighty degrees (180°) in the first edge region and an interior angle which is less than one hundred and eighty degrees (180°) in the second edge region.

3. A compression section of an axial flow rotary machine of the type having an annular flow path for working medium gases disposed about an engine axis which comprises:

an outer wall circumscribing the annular flow path;
an inner wall spaced inwardly from the outer wall and bounding the flow path;
at least one array of rotor blades extending outwardly from the inner wall into proximity with the outer wall and including a plurality of airfoils, each airfoil having a spanwise axis, a first edge region extending spanwisely, and a second edge region extending spanwisely
wherein the outer wall is spaced a distance $R_{ox}$ from the axis of the engine and has a slope $R'_{ox}$ with respect to the axis of the engine as measured in a plane containing the axis of the engine and intersecting the outer wall, and the inner wall is spaced a distance $R_{ix}$ from the axis of the engine and has a slope $R'_{ix}$ with respect to the axis of the engine as measured in a plane containing the axis of the engine and intersecting the inner wall, and wherein $R_{ox}$ and $R'_{ox}$ have a magnitude $R_{o1}$ and $R'_{o1}$ at a first location in said edge region and a magnitude $R_{o2}$ and $R'_{o2}$ at a second location in said edge region, the second location being downstream of the first location such that $R'_{o1}$ does not equal $R'_{o2}$ ($R'_{o1} \neq R'_{o2}$), and the ratio $R_{o1}$ to $R_{o2}$ is greater than one ($R_{o1}/R_{o2} > 1.0$) and the absolute value of $R'_{o1}$ is greater than the absolute value of $R'_{o2}$ ($|R'_{o1}| > |R'_{o2}|$), and $R_{ix}$ and $R'_{ix}$ have a magnitude $R_{i1}$ and $R'_{i1}$ at a first location in said edge region and a magnitude $R_{i2}$ and $R'_{i2}$ at a second location in said edge region, the second location being downstream of the first location such that $R'_{i1}$ does not equal $R'_{i2}$ ($R'_{i1} \neq R'_{i2}$), the ratio $R_{i1}$ to $R_{i2}$ is less than one ($R_{i1}/R_{i2} < 1.0$) and the absolute value of $R'_{i1}$ is less than the absolute value of $R'_{i2}$ ($|R'_{i1}| < |R'_{i2}|$):

wherein $R_{ox}$ and $R'_{ox}$ have a magnitude $R_{o3}$ and $R'_{o3}$ at a first location in said second edge region and a magnitude $R_{o4}$ and $R'_{o4}$ at a second location in said second edge region, the second location being downstream of the first location such that $R'_{o3}$ does not equal $R'_{o4}$ ($R'_{o3} \neq R'_{o4}$), and the ratio $R_{o3}$ to $R_{o4}$ is greater than one ($R_{o3}/R_{o4} > 1.0$) and the absolute value of $R'_{o3}$ is less than the absolute value of $R'_{o4}$ ($|R'_{o3}| < |R'_{o4}|$), and $R_{ix}$ and $R'_{ix}$ have a magnitude $R_{i3}$ and $R'_{i3}$ at a first location in said second edge region and a magnitude $R_{i4}$ and $R'_{i4}$ at a second location in said second edge region, the second location being downstream of the first location such that $R'_{i3}$ does not equal $R'_{i4}$ ($R'_{i3} \neq R'_{i4}$), the ratio $R_{i3}$ to $R_{i4}$ is less than one ($R_{i3}/R_{i4} < 1.0$) and the absolute value of $R'_{i3}$ is greater than the absolute value of $R'_{i4}$ ($|R'_{i3}| > |R'_{i4}|$).

4. The invention as claimed in claim 3 wherein the airfoil of each blade has a leading edge region and a trailing edge region and wherein the first edge region is the leading edge region and the second edge region is the trailing edge region.

5. The invention as claimed in claim 4 wherein the inner wall rotates about the axis of the engine.

6. For an axial flow rotary machine having an engine axis and an annular flow path, a compression section for working medium gases which comprises:
an outer wall circumscribing the annular flow path;
an inner wall spaced inwardly from the outer wall and bounding the flow path;
an array of stator vanes extending inwardly from the outer wall into proximity with the inner wall each vane having an airfoil, the airfoil of each vane having a tip which is parallel to the axis of the engine;
an array of rotor blades extending outwardly into proximity with the outer wall, each blade having an airfoil, the airfoil of each blade having a leading edge region, a trailing edge region and a tip, the tip being parallel to the axis of the engine;

wherein the outer wall is spaced a distance $R_{ox}$ from the axis of the engine and has a slope $R'_{ox}$ with respect to the axis of the engine as measured in a plane containing the axis of the engine and intersecting the outer wall, and the inner wall is spaced a distance $R_{ix}$ from the axis of the engine and has a slope $R'_{ix}$ with respect to the axis of the engine as measured in a plane containing the axis of the engine and intersecting the inner wall, and wherein $R_{ox}$ and $R'_{ox}$ have a magnitude $R_{o1}$ and $R'_{o1}$ at a first location in the leading edge region and a magnitude $R_{o2}$ and $R'_{o2}$ at a second location in the leading edge region, the second location being downstream of the first location such that $R'_{o1}$ does not equal $R'_{o2}$ ($R'_{o1} \neq R'_{o2}$) and $R'_{o2}$ is equal to zero ($R'_{o2} = 0$), and the ratio $R_{o1}$ to $R_{o2}$ is greater than one ($R_{o1}/R_{o2} > 1.0$);

$R_{ix}$ and $R'_{ix}$ have a magnitude $R_{i1}$ and $R'_{i1}$ at a first location in the leading edge region and a magnitude $R_{i2}$ and $R'_{i2}$ at a second location in the leading edge region, the second location being downstream of the first location such that $R'_{i1}$ does not equal $R'_{i2}$ ($R'_{i1} \neq R'_{i2}$) and $R'_{i1}$ is equal to zero ($R'_{i1} = 0$), and the ratio $R_{i1}$ to $R_{i2}$ is less than one ($R_{i1}/R_{i2} < 1.0$) and the absolute value of $R'_{i1}$ is less than the absolute value of $R'_{i2}$ ($|R'_{i1}| < |R'_{i2}|$);

$R_{ox}$ and $R'_{ox}$ have a magnitude $R_{o3}$ and $R'_{o3}$ at a first location in the trailing edge region and a magnitude $R_{o4}$ and $R'_{o4}$ at a second location in the trailing edge region, the second location being downstream of the first location such that $R'_{o3}$ does not equal $R'_{o4}$ ($R'_{o3} \neq R'_{o4}$) and $R'_{o3}$ is equal to zero ($R'_{o3} = 0$), and the ratio $R_{o3}$ to $R_{o4}$ is greater than one ($R_{o3}/R_{o4} > 1.0$) and the absolute value of $R'_{o3}$ is less than the absolute value of $R'_{o4}$ ($|R'_{o3}| < |R'_{o4}|$), $R_{ix}$ and $R'_{ix}$ have a magnitude $R_{i3}$ and $R'_{i3}$ at a first location in the trailing edge region and a magnitude $R_{i4}$ and $R'_{i4}$ at a second location in the trailing edge region, the second location being downstream of the first location such that $R'_{i3}$ does not equal $R'_{i4}$ ($R'_{i3} \neq R'_{i4}$) and $R'_{i4}$ is equal to zero ($R'_{i4} = 0$), and the ratio $R_{i3}$ to $R_{i4}$ is less than one ($R_{i3}/R_{i4} < 1.0$) and the absolute value of $R'_{i3}$ is greater than the absolute value of $R'_{i4}$ ($|R'_{i3}| > |R'_{i4}|$), and wherein $R_{ix}$ and $R'_{ix}$ have a magnitude $R_{i5}$ and $R'_{i5}$ at any location on the inner wall facing a tip of an airfoil in the array of stator vanes and $R'_{i5}$ is equal to zero ($R'_{i5} = 0$) such that a cylindrical surface faces the tips of the array of stator vanes, wherein a cylindrical surface on the outer wall extends between the second location in the leading edge region having an $R'_{o2} = 0$ and the first location in the trailing edge region having an $R'_{o3} = 0$, such that a cylindrical surface faces the tips of the array of rotor blades, and wherein a frusto-conical surface on the inner wall extends between the second location in the leading edge region which has an $R'_{i2}$ not equal to zero ($R'_{i2} \neq 0$) and the first location in the trailing edge region which has an $R'_{i3}$ not equal to zero ($R'_{i3} \neq 0$) such that a flow path contraction occurs at the inner wall.

7. The invention as claimed in claim 6 wherein the array of stator vanes is at a location upstream of the array of rotor blades such that $R_{i5}$ is less than $R_{i2}$ ($R_{i5} < R_{i2}$) and $R_{i5}$ is less than or equal to $R_{i1}$ ($R_{i5} \leq R_{i1}$).

* * * * *